(12) United States Patent
Choi et al.

(10) Patent No.: US 9,134,950 B2
(45) Date of Patent: Sep. 15, 2015

(54) VIDEO WALL DISPLAY SYSTEM

(75) Inventors: Dong-hoon Choi, Suwon-si (KR);
Young-kyan Yun, Suwon-si (KR);
Sung-woo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1065 days.

(21) Appl. No.: 12/841,816

(22) Filed: Jul. 22, 2010

(65) Prior Publication Data

US 2011/0122048 A1    May 26, 2011

(30) Foreign Application Priority Data

Nov. 25, 2009    (KR) .................. 10-2009-0114705

(51) Int. Cl.
*G06F 3/14* (2006.01)
*G09G 5/00* (2006.01)

(52) U.S. Cl.
CPC .............. *G06F 3/1446* (2013.01); *G09G 5/003* (2013.01); *G09G 5/006* (2013.01); *G09G 2370/042* (2013.01); *G09G 2370/045* (2013.01)

(58) Field of Classification Search
USPC ...................................... 345/1.1–1.3
See application file for complete search history.

(56) References Cited

U.S. PATENT DOCUMENTS

| 2002/0163513 A1* | 11/2002 | Tsuji ............................. 345/204 |
| 2003/0146882 A1* | 8/2003 | Ogino et al. ................... 345/1.1 |
| 2006/0076906 A1 | 4/2006 | Thielemans et al. |
| 2006/0077192 A1 | 4/2006 | Thielemans et al. |
| 2007/0057914 A1* | 3/2007 | Park ............................. 345/156 |
| 2008/0165992 A1 | 7/2008 | Kondo et al. |
| 2008/0218505 A1* | 9/2008 | Choi ............................. 345/212 |
| 2010/0001923 A1* | 1/2010 | Zilber ............................ 345/1.1 |

FOREIGN PATENT DOCUMENTS

| EP | 1548573 A1 | 6/2005 |
| EP | 1550947 A2 | 7/2005 |
| JP | 11-75145 A | 3/1999 |
| JP | 11-252483 A | 9/1999 |
| JP | 2008-109209 A | 5/2008 |
| KR | 10-1995-0004458 B1 | 5/1995 |
| KR | 10-2009-0033976 A | 4/2009 |

OTHER PUBLICATIONS

Extended European Search Report issued Aug. 18, 2011 in counterpart European Application No. 10174911.7.

* cited by examiner

*Primary Examiner* — Kenneth Bukowski
(74) *Attorney, Agent, or Firm* — Sughrue Mion, PLLC

(57) ABSTRACT

A video wall system which includes a plurality of display devices, the video wall display system including a plurality of display devices, and each of the display devices including: a pair of input and output connectors comprising an input connector connected to a first neighboring display device among the plurality of display devices to input an image signal from the first neighboring display device, and an output connector connected to a second neighboring display device to output the input image signal; a signal processor which processes the input image signal; and a display which displays an image based on the processed image signal.

23 Claims, 6 Drawing Sheets

VIDEO WALL DISPLAY SYSTEM

CROSS-REFERENCE TO RELATED APPLICATION

This application claims priority from Korean Patent Application No. 10-2009-0114705, filed on Nov. 25, 2009 in the Korean Intellectual Property Office, the disclosure of which is incorporated herein by reference.

BACKGROUND

1. Field

Apparatuses and methods consistent with the exemplary embodiments relate to a video wall display system which includes a plurality of display devices, and more particularly, to a video wall display system in which neighboring display devices are connected in series via a plurality of pairs of input and output connectors. Accordingly, a cable connection to connect neighboring display devices is simplified, and a signal connection between neighboring display devices can realize a standardized video wall display system, thereby improving a user's convenience and achieving cost efficiency in a manufacturing process.

2. Description of the Related Art

A video wall display system is a method to overcome the limited size of an image which a single display device can display. Specifically, the video wall display system divides one image into a plurality of images and the divided images are displayed on a plurality of display devices.

Since a plurality of display devices of a related art video wall display system have the same main board as a general display device, a separate signal cable or a signal distributor to connect signals between the display devices is necessary in order to form the video wall. Furthermore, all cables are connected under the display devices like a general display device, and thus a cable configuration to connect the display devices is substantially complicated or difficult.

SUMMARY

Accordingly, one or more exemplary embodiments provide a video wall display system which uses a plurality of pairs of input and output connectors to connect neighboring display devices in serial, thereby simplifying a cable connection for a signal connection.

Another exemplary embodiment provides a video wall display system which uses a plurality of pairs of input and output connectors to connect neighboring display devices in serial, thereby allowing a signal input from an outside to be transmitted to all of a plurality of display devices.

Still another exemplary embodiment provides a video wall display system which is capable of controlling audio output units of individual display devices even if each of the display devices is not given an ID, since a plurality of pairs of input and output connectors are used to connect neighboring display devices in serial so that positions of the individual display devices of the video wall display system can be identified.

According to an aspect of an exemplary embodiment, there is provided a video wall display system including a plurality of display devices, each of the display devices including: a plurality of pairs of input and output connectors including an input connector connected to a first neighboring display device among the plurality of display devices to input an image signal from the first neighboring display device and an output connector connected to a second neighboring display device to output the input image signal; a signal processor which processes the input image signal; and a display which displays an image based on the processed image signal.

The signal processor processes the input image signal may control the pair of input and output connectors to output the image signal to the output connector connected to the second neighboring display device.

The input connector may be input with the image signal from an external device.

At least one of the display devices may further include a user signal input unit corresponding to an input by a user, and a user signal input to the user signal input unit may be input and output through the pairs of input and output connectors.

Each of the display devices may further include a serial communication interface for input and output of the user signal.

Each of the display devices may further include a controller which identifies a target display device of the user signal, the controller performing a process corresponding to the user signal if identified as the target display device of the user signal, and controlling the serial communication interface to convert the user signal into a signal for serial communication to be bypassed if identified not as the target display device of the user signal.

The controller may perform a process corresponding to the user signal and may control the serial communication interface to convert the user signal into the signal for serial communication to be output.

The user signal may be a signal for ID setup of each of the display devices, and the controller may identify a target display device of the user signal, perform the ID setup corresponding to the user signal if identified as the target display device, and bypass the user signal if identified not as a target display device.

The user signal may be a signal for at least one color adjustment to each of the display devices, the at least one color adjustment including at least one of adjustment to screen brightness, tone of color, contrast, white balance, definition, and tint, and the controller may identify an object of the user signal, perform the color adjustment corresponding to the user signal if identified as the target display device of the user signal, and bypass the user signal if identified not as the target display device.

The user signal may be a signal for overall color adjustment to the video wall display system, and the controller may perform the color adjustment to a corresponding display device in accordance with the signal for overall color adjustment to the video wall display system.

Each of the display devices may further include a plurality of audio output units which outputs a sound based on an audio signal transmitted through the pairs of input and output connectors; and a controller which controls audio output of the audio output units based on whether the audio signal is transmitted through the pairs of input and output connectors.

The controller may control an audio output of the audio output units based on a transmission direction of the audio signal through the pairs of input and output connectors.

The controller may control the audio output units not to output a sound if the audio signal through the pairs of input and output connectors is transmitted in left and right directions.

The controller may control the audio output units so that only audio output units disposed on a right side of the display devices output a sound if the audio signal input through the pairs of input and output connectors is not output in a right direction.

The controller may control the audio output units so that only audio output units disposed on a left side of the display devices output a sound if the audio signal input through the pairs of input and output connectors is not output in a left direction.

According to an aspect of another exemplary embodiment, there is provided a display device of a video wall display system including a plurality of display devices, the display device including: a first pair of input and output connectors comprising an input connector connectable to a first neighboring display device among the plurality of display devices to input an image signal from the first neighboring display device, and an output connector connectable to a second neighboring display device among the plurality of display devices to output the input image signal to the second neighboring display device; a signal processor which processes the input image signal input; and a display which displays an image based on the processed image signal.

According to an aspect of another exemplary embodiment, there is provided a method of a video wall display system including a plurality of display devices, the method including: receiving, by a first display device among the plurality of display devices, an input image signal from a second display device among the plurality of display devices; transmitting, by the first display device, the input image signal to a third display device among the plurality of display devices; and displaying, by the first display device, an image based on the input image signal.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
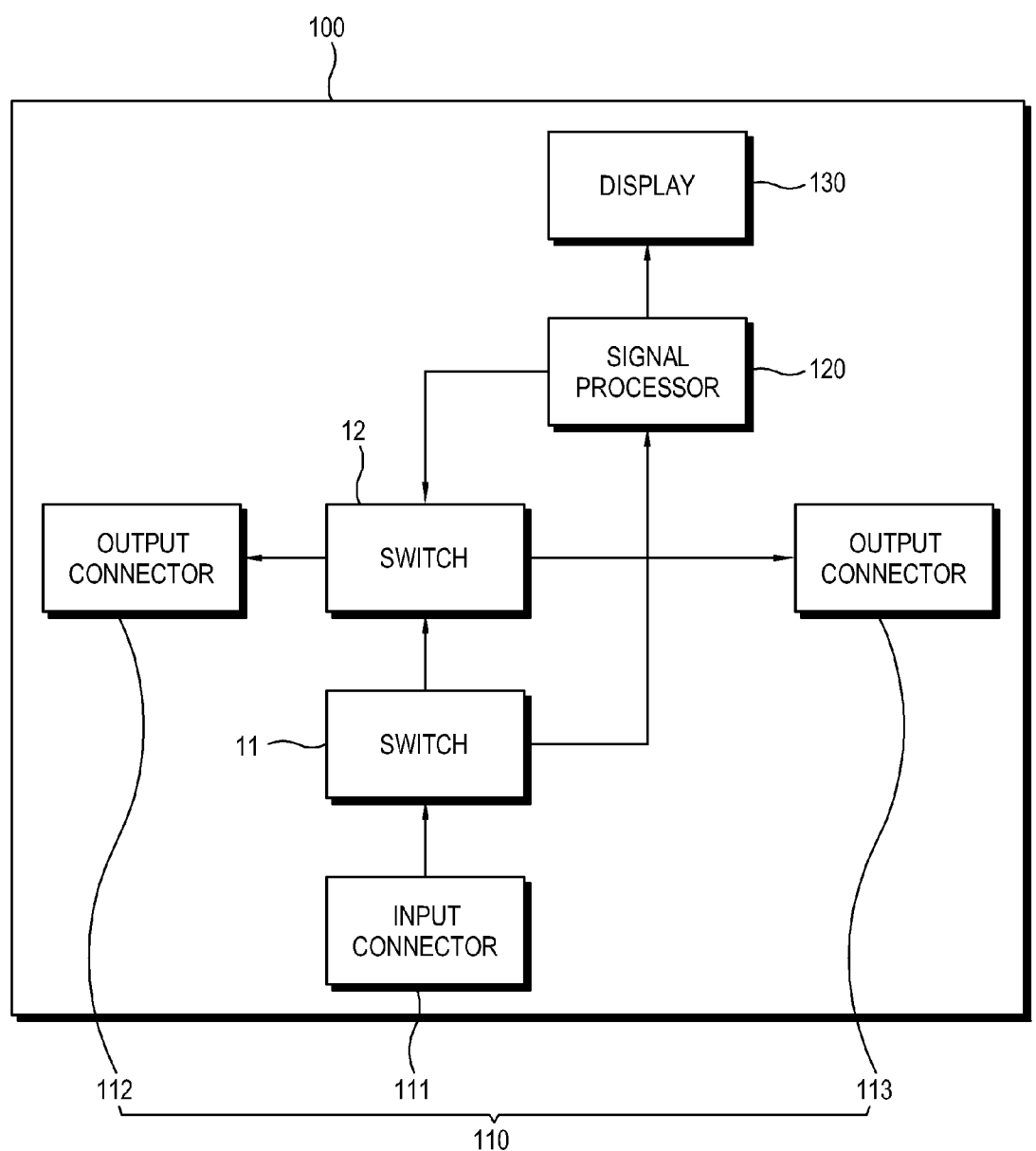
FIG. 1 is a control block diagram illustrating a configuration of one of a plurality of display devices included in a video wall display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

FIG. 1 is a control block diagram illustrating a configuration of one of a plurality of display devices included in a video wall display system according to an exemplary embodiment. Referring to FIG. 1, a display device 100 includes a plurality of pairs of input and output connectors 110, a signal processor 120, and a display 130.

For ease of understanding, FIG. 1 shows only a pair of input and output connectors 110. Each display device according to an exemplary embodiment may include a plurality of pairs of input and output connectors 110, which will be described with reference to FIG. 2.

The pair of input and output connectors 110 include an input connector 111 connected to a first neighboring display device among the plurality of display devices to receive an image signal from the first neighboring display device and at least one output connector 112 and 113 connected to a second neighboring display device to output the image signal input to the input connector 111. Specifically, the at least one output connector may include a first output connector 112 connected to the second neighboring display device and a second output connector 113 connected to a third neighboring display device in order to output the image signal.

An image signal is input to the input connector 111 from the first neighboring display device of the plurality of display devices, and then transmitted to the signal processor 120 via a first switch 11 connected to the input connector 111.

The signal processor 120 processes the image signal to be displayed on the display 130 and transmits the processed image signal to the display 130. Further, the signal processor 120 identifies whether the output connector 112 is actually connected to the second neighboring display device among at least one output connector connected to the second neighboring display device. Moreover, when the at least one output connector includes the first output connector 112 which outputs a signal to the second neighboring display device and the second output connector 113 which outputs a signal to the third neighboring display device, the signal processor 120 may identify which of the first output connector 112 and the second output connector 113 is actually connected to a neighboring display device.

If the first output connector 112 is connected to the second neighboring display device and the second output connector 113 is not connected to the third neighboring display device, the signal processor 120 manipulates a second switch 12 so that the image signal is output to the second neighboring display device via the first output connector 112.

If the second output connector 113 is connected to the third neighboring display device, the signal processor 120 manipulates the second switch 12 so that the image signal is output to the third neighboring display device via the second output connector 113.

If both the first output connector 112 and the second output connector 113 are not connected to the second neighboring display device and the third neighboring display device, respectively, the signal processor 120 manipulates the second switch 12 so that the image signal is not output to any output connector 112 and 113.

Thus, the signal processor 120 processes an image signal input to the input connector 111 and controls the pair of input and output connectors 110 so that the image signal is output or is not output to at least one output connector 112 and 113 connected to the second neighboring display device.

Here, one input connector 111 and at least one output connector 112 and 113 of the pair of input and output connectors 110 may be provided in different positions. That is, in the display device 100 with four sides (i.e., up, down, left, and right sides), if the input connector 111 is disposed on the down side, the output connector is disposed on at least one of the other three sides where the input connector 111 is not disposed.

For example, in the case of the pair of input and output connectors 110 having one input connector 111 and two output connectors 112 and 113, if the input connector 111 is disposed on the down side, the two output connectors 112 and 113 may be disposed on two other sides of the three sides other than the down side. Specifically, if the input connector 111 is disposed on the down side, the two output connectors 112 and 113 may be disposed on the left and right sides, respectively, on the left and up sides, respectively, or on the up and right sides, respectively.

Here, the input and output connectors 110 may include a plurality of ports for high-definition multimedia interface (HDMI), a component connection, digital visual interface (DVI), RS232C communication, a broadcast signal receiver, an external device, etc.

Moreover, the external device is a device which is capable of transmitting an image signal to the display device 100 and may include a personal computer (PC), a digital versatile disc (DVD) player, a Blu-ray disc (BD) player, a personal video recorder (PVR), an external server, a web server, a portable multimedia player, a mobile device, etc.

Accordingly, at least one of the display devices 100 may receive an image signal from an external device via the input connector 111. Then, the display device 100 transmits the image signal received from the external device to the signal processor 120, and the signal processor 120 outputs the image signal to at least one of the output connectors 112 and 113.

The signal processor 120 processes the image signal input to the input connector 111 to be displayed on the display 130. Thus, the signal processor 120 may include a scaler (not shown), a decoder (not shown), etc.

The signal processor 120 identifies which of the output connectors 112 and 113 is connected to a neighboring display device. Accordingly, the signal processor 120 controls the second switch 12 to determine which of the output connectors 112 and 113 an image signal is output to.

The display 130 displays an image based on an image signal processed by the signal processor 120. The display 130 may include any type of displays to display an image, e.g., cathode ray tube (CRT), liquid crystal display (LCD), light emitting diode (LED) display, organic LED display (OLED), plasma display panel (PDP), etc.

Meanwhile, each of the display devices according to an exemplary embodiment may include one or more pairs of input and output connectors 110.

Figure 2:
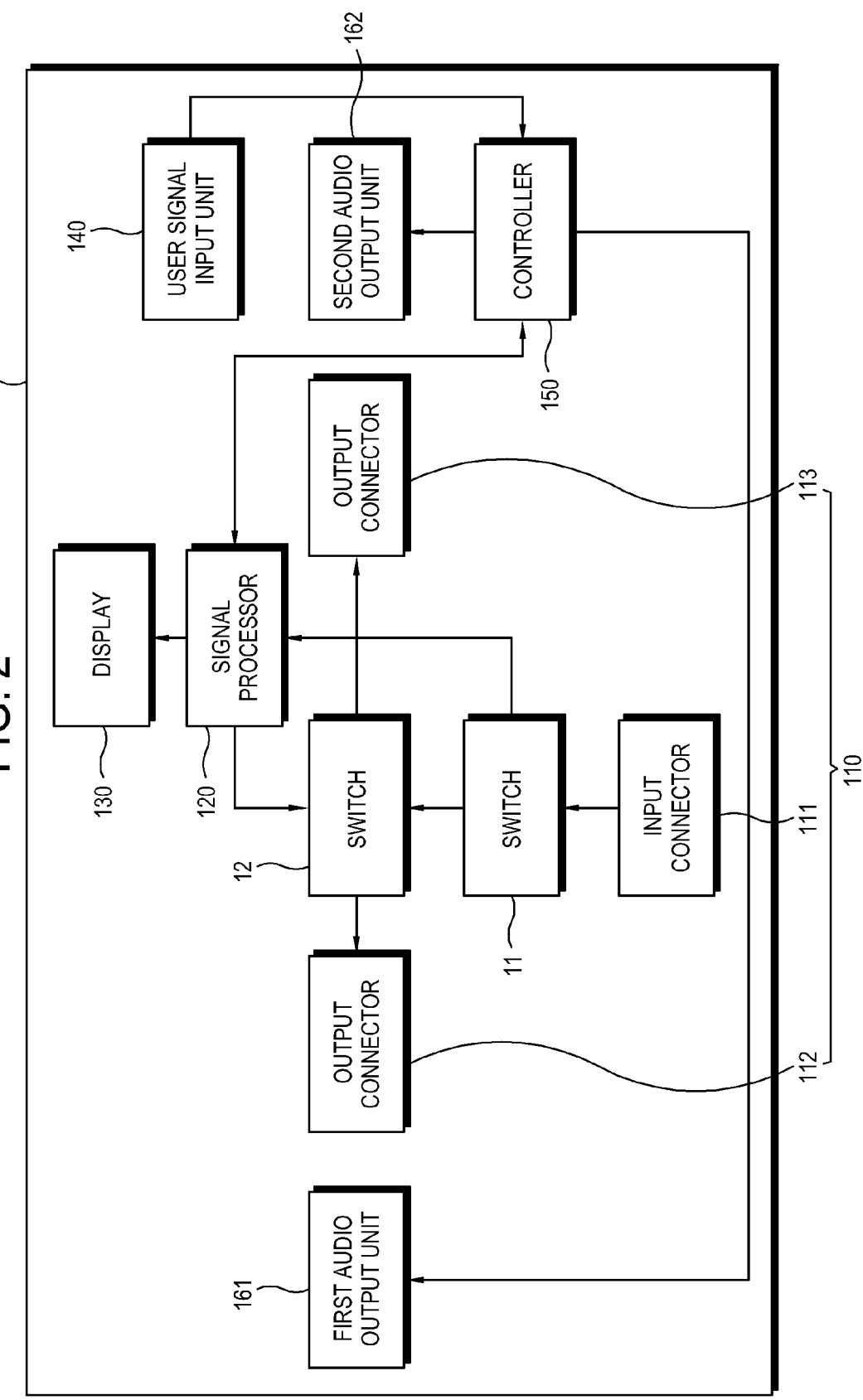
FIG. 2 is a block diagram illustrating a configuration of one of a plurality of display devices included in a video wall display system according to another exemplary embodiment.

FIG. 2 is a block diagram illustrating a configuration of one of a plurality of display devices included in a video wall display system according to another exemplary embodiment. Referring to FIG. 2, a display device 100 may further include a user signal input unit 140, a controller 150, and a plurality of audio output units 161 and 162 in addition to at least one pair of input and output connectors 110, a signal processor 120, and a display 130, which are described above with reference to FIG. 1. As the pairs of input and output connectors 110, the signal processor 120, and the display 130 are explained above, descriptions thereof are omitted herein.

The user signal input unit 140 is input with a signal corresponding to a user's input. The user signal input unit 140 is included in at least one of the plurality of display devices 100 of the video wall display system.

A user signal input to the user signal input unit 140 may be input or output through the pairs of the input and output connectors 110. Thus, each of the display devices 100 may further include a serial communication interface for input and output of the user signal.

The serial communication interface may be synchronous or asynchronous. For example, the serial communication interface may be a universal asynchronous receiver and transmitter (UART).

As mentioned above, the pairs of input and output connectors 110 according to an exemplary embodiment may include a port which enables serial communication, e.g., RS232C. Thus, a serial signal output through the serial communication interface may be transmitted to a neighboring display device via the port conducting serial communication.

The controller 150 identifies a target display device of the plurality of display devices for the input user signal. As a result, if identified as a target display device of the input user signal, the controller 150 conducts a process corresponding to the user signal. If identified not as the target display device of the input user signal, the controller 150 controls the serial communication interface to convert the user signal into a signal for serial communication to be bypassed.

Here, the controller 150 carries out a process corresponding to the input user signal and controls the serial communication interface to convert the user signal into a signal for serial communication to be output.

Furthermore, a signal input through the user signal input unit 140 may be a signal to set up an ID for each of the display devices 100.

Accordingly, when a signal for ID setup is input, the controller 150 identifies whether a target display device of the user signal is a corresponding display device. Then, if identified as the target display device of the user signal, the controller 150 carries out ID setup of the corresponding display device. If identified not as the target display device of the user signal, the controller 150 converts the signal into a signal for serial communication to be bypassed.

Here, a signal input through the user signal input unit 140 may be a signal for at least one color adjustment to each of the display devices 100. The at least one color adjustment may include at least one of adjustment to screen brightness, tone of color, contrast, white balance, definition, and tint. The controller 150 identifies a target display device of the input user signal, and if identified as the target display device, the controller 150 conducts color adjustment corresponding to the user signal. If identified not as the target display device, the controller 150 bypasses the signal.

If the input user signal is a signal for overall color adjustment to the video wall display system, the controller 150 carries out color adjustment to a corresponding display device 100 in accordance with a signal for overall color adjustment to the video wall display system.

The audio output units 161 and 162 output a sound based on an audio signal having a plurality of sound sources transmitted through the pairs of input and output connectors 110. The controller 150 controls the audio output units 161 and 162 to output a sound on the basis of whether the audio signal is transmitted through the pairs of input and output connectors 110.

Figure 3:
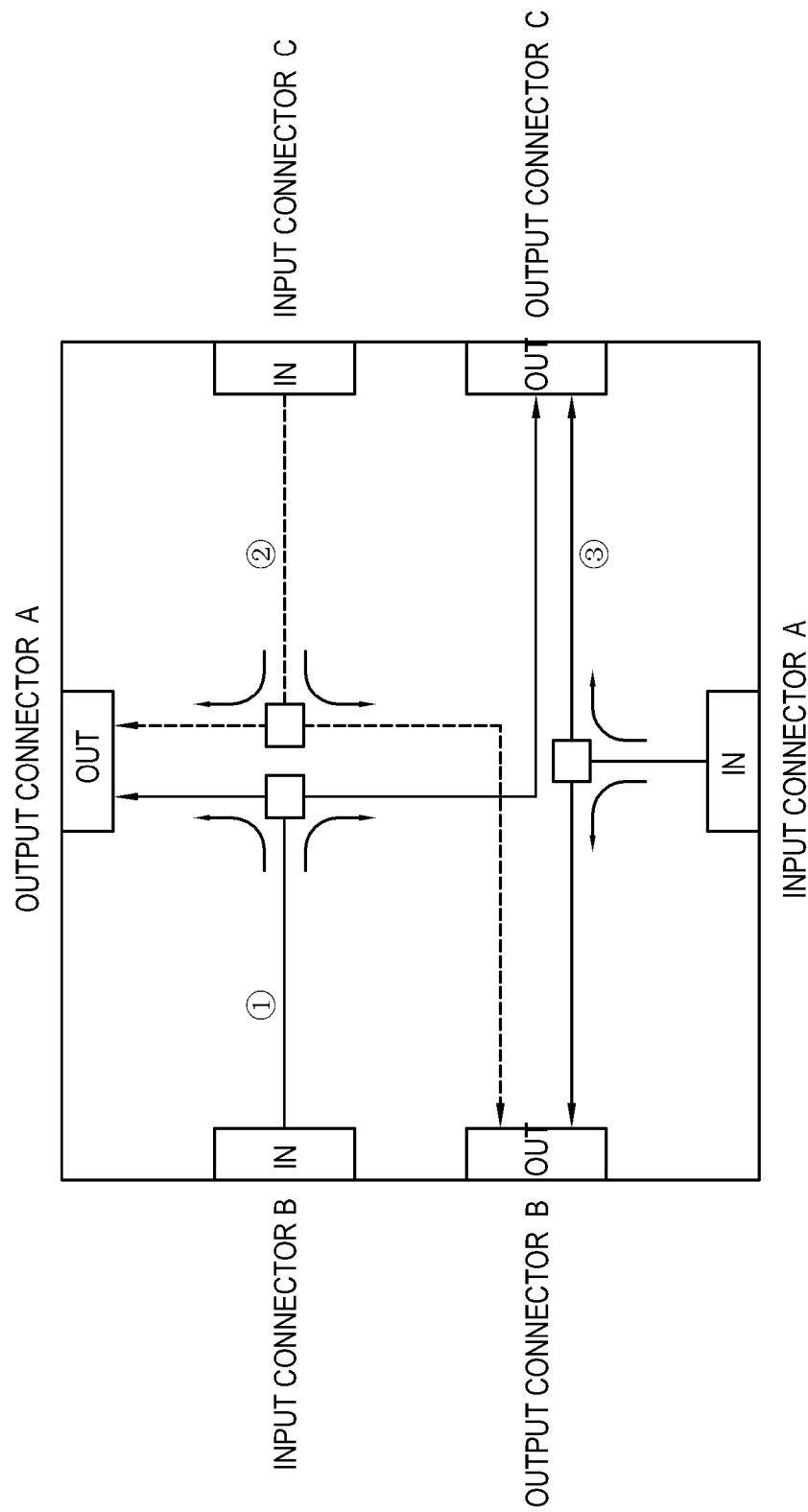
FIG. 3 is a block diagram illustrating a configuration of a plurality of pairs of input and output connectors of a display device according to an exemplary embodiment.

FIG. 3 is a block diagram illustrating a configuration of a plurality of pairs of input and output connectors 110 of a display device 100 according to an exemplary embodiment. That is, FIG. 3 shows three pairs of input and output connectors 110 according to an exemplary embodiment.

As shown in FIG. 3, each pair of the three pairs of input and output connectors 110 includes one input connector 111 and two output connectors 112 and 113. The input connector 111 is connected to the two output connectors 112 and 113, and the two output connectors 112 and 113 are disposed in different adjacent directions from the input connector. Further, a plurality of input connectors 111 are provided, and disposed in different adjacent directions, respectively.

For example, an input connector A is connected to output connectors B and C. Thus, a signal input to input the connector A is output to one of the output connectors B and C. Further, an input connector B is connected to output connectors A and C. Thus, a signal input to the input connector B is output to one of the output connectors A and C. In addition, an input connector C is connected to the output connectors A and B. Thus, a signal input to the input connector C is output to one of the output connectors A and B.

Therefore, the display device 100 according to an exemplary embodiment includes a plurality of pairs of input and output connectors 110, and thus a plurality of display devices may be connected in serial in any direction, e.g., up, down, left and right. Accordingly, a configuration of cables may be simplified.

Figure 4:
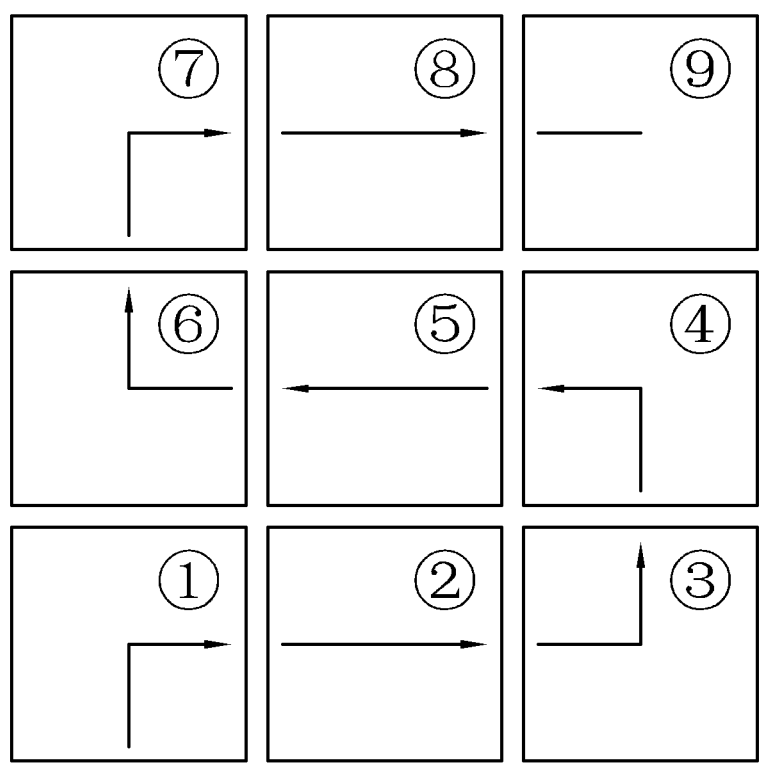
FIG. 4 illustrates signal flow in a video wall display system having a plurality of display devices connected via a plurality of pairs of input and output connectors according to an exemplary embodiment.

FIG. 4 illustrates signal flow in a video wall display system having a plurality of display devices connected via a plurality of pairs of input and output connectors 110 according to an exemplary embodiment. As shown in FIG. 4, in a 3×3 video wall display system, when a first display device receives an image signal from an external device, the image signal is output through an output connector disposed on the right side of the first display device and input through an input connector disposed in the left side of a second display device.

Then, the image signal is output through an output connector disposed on the right side of the second display device and input to an input connector disposed on the left side of a third display device. Subsequently, the signal is output through an output connector disposed on the upper side of the third display device and input to an input connector disposed on the lower side of a fourth neighboring display device. In this way, the display devices are connected in serial through the plurality of the pairs of input and output connectors, so that the image signal input to the first display device may be transmitted to a ninth display device.

The signal flow in FIG. 4 is only a non-limiting illustrative example. Alternatively, an image signal input to the first display device may be transmitted to the ninth display device via a sixth display device, a seventh display device, an eighth display device, a fifth display device, the second display device, the third display device, and the fourth display device, in order.

The video wall display system having a plurality of display devices according to an exemplary embodiment may be formed in different types of video wall systems having various numbers of display devices, e.g., 2×2, 4×4 and 5×5, in addition to the 3×3 video wall.

Further, in a video wall display system according to an exemplary embodiment, at least one of the display devices may further include a user signal input unit corresponding to a user's input, and a user signal input to the user signal input unit may be input and output through the pairs of input and output connectors.

Figure 5:
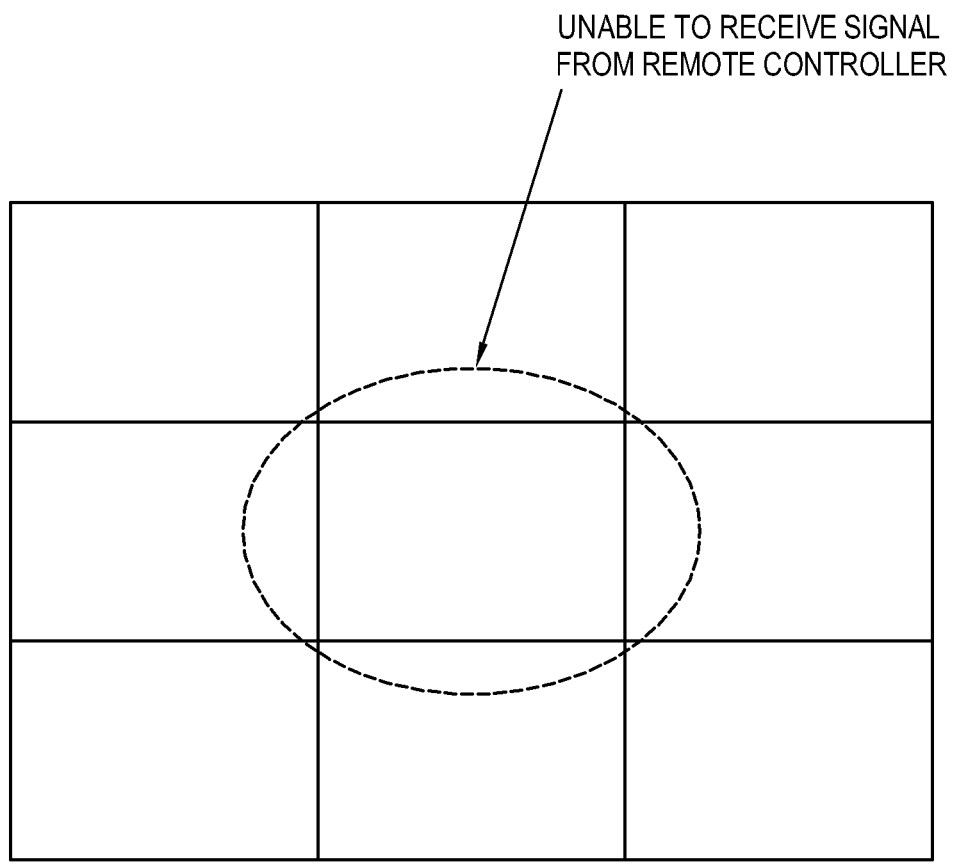
FIG. 5 is a related art video wall display system which is not capable of receiving a user's signal from an outside user signal input unit.

FIG. 5 is a related art video wall display system which is not capable of receiving a user's signal from an outside user signal input unit.

A related art display device tends to be slimmer. Thus, a user signal input unit is often disposed not on the front side of the display device but on a lateral side. Here, in the case a display device with a user signal input unit disposed at a lateral side is positioned in a central position of a video wall display system, a display device which can not receive a user signal may occur, as pointed out in FIG. 5.

However, in a video wall display system with a plurality of display devices connected in serial via a plurality of pairs of input and output connectors according to an exemplary embodiment, a user signal may be transmitted along the signal flow shown in FIG. 4.

Thus, at least one of the plurality of display devices further includes a user signal input unit 140, and a user signal received to the user signal input unit 140 is input and output via the pairs of input and output connectors 110 as well as the image signal explained in FIG. 4. Accordingly, the user signal input to the input unit 140 is transmitted from a first display device to a ninth display device. In this regard, even if the display device in the central position of the video wall cannot directly receive a user signal, the display device can receive a user signal from a display device having the user signal input unit 140.

The user signal may include an infrared (IR) signal, which is transmitted from the user signal input unit 140 such as an external remote controller.

Each of the display devices according to an exemplary embodiment may further include a serial communication interface for input and output of the user signal. The serial communication interface may be synchronous or asynchronous. For example, the serial communication interface may be a universal asynchronous receiver and transmitter (UART).

As mentioned above, the pairs of input and output connectors 110 may include a port (not shown) which enables serial communication, e.g., RS232C. Thus, a serial signal output through the serial communication interface may be transmitted to a neighboring display device via the port conducting serial communication.

Each of the display devices 100 may further include a controller 150 which identifies a target display device of the input user signal. The controller 150 conducts a process corresponding to the user signal if identified as a target display device of the input user signal, and controls the serial communication interface to convert the user signal into a signal for serial communication to be bypassed if identified not as the target display device of the input user signal.

In the video wall display system having the plurality of display devices, the pairs of input and output connectors 110 connecting the display devices in serial enable position recognition even if individual IDs for the display devices are not set up.

Thus, when a user signal for a specific display device among the display devices is input through the user signal input unit 140, the controller 150 identifies a target display device of the user signal. Then, if identified as the target display device of the user signal, the controller 150 carries out a process of the user signal on a corresponding display device. If identified not as the target display device of the user signal, the controller 150 controls the serial communication interface to convert the user signal into a signal for serial communication to be bypassed to a neighboring display device.

Here, the controller 150 carries out a process corresponding to the input user signal and controls the serial communication interface to convert the user signal into a signal for serial communication to be output to a neighboring display device.

According to an exemplary embodiment, the controller 150 of the first display device which receives a screen brightness control signal from a remote controller adjusts screen brightness in accordance with the signal and converts the control signal into a signal for serial communication to output to the second neighboring display device. The controller 150 of the second display device also adjusts screen brightness in accordance with the signal and outputs the control signal to the third neighboring display device. In the same manner, the control signal received by the first display device is transmitted to the ninth display device.

Accordingly, in the video wall display system according to an exemplary embodiment, a control signal for all the display devices of the system is received by a specific display device and transmitted to the rest of display devices. Similarly, a control signal for a specific display device among the display devices is received by another display device and transmitted to the specific display device.

In this manner, ID setup and adjustment to screen brightness, tone of color, contrast, white balance, definition, and tint are enabled for the display devices in whole or individually.

Namely, when a signal to set up an ID for each of the display devices is input through the user signal input unit 140, the controller 150 identifies whether a target display device of the user signal is a corresponding display device. Then, if identified as the target display device of the user signal, the controller 150 carries out ID setup of the corresponding display device. If identified not as the target display device of the user signal, the controller 150 converts the signal into a signal for serial communication to be bypassed.

Further, if a signal input through the user signal input unit 140 is a signal for at least one color adjustment to each of the display devices selected from among, for example, adjustment to screen brightness, tone of color, contrast, white balance, definition, and tint, the controller 150 identifies a target display device of the input user signal. Then, if identified as the target display device, the controller 150 conducts color adjustment corresponding to the user signal. If identified not as the target display device, the controller 150 bypasses the signal.

In addition, if the input user signal is a signal for overall color adjustment to the video wall display system, the controller 150 carries out color adjustment to a corresponding display device in accordance with the signal for overall color adjustment to the video wall display system.

For example, assume that the video wall display system has overall screen brightness adjustable from 0 to 100, and the overall screen brightness of the video wall display system is to be adjusted to 70 by the user signal. In this case, even if the display devices of the display system all have a screen brightness of 50 or have different levels of screen brightness, the controllers 150 of the respective display devices enable the display devices to have a screen brightness of 70, respectively, in accordance with the user signal for overall color adjustment.

Alternatively, given that the display devices of the video wall display system have different levels of screen brightness, respectively, and the overall screen brightness of the display system is to be adjusted upward by 10 levels by the user signal, the controllers 150 of the display devices upwardly adjust the overall screen brightness of the display devices by 10 levels, respectively. Namely, assume that the display system includes display devices A, B, C and D, and the display device A has a screen brightness of 40, the display device B has a screen brightness of 50, the display device C has a screen brightness of 60, and the display device D has a screen brightness of 65. Here, when a user signal to upwardly adjust the overall screen brightness of the display system by 10 levels is input, the controller 150 of the display device A adjusts the screen brightness to 50, the controller 150 of the display device B adjusts the screen brightness to 60, the controller 150 of the display device C adjusts the screen brightness to 70, and the controller 150 of the display device D adjusts the screen brightness to 75.

Likewise, when a user signal to adjust at least one of tone of color, contrast, white balance, definition, and tint of the entire video wall display system is input, the controller 150 adjusts the at least one of tone of color, contrast, white balance, definition, and tint of a corresponding display device according to the signal.

In the video wall display system according to an exemplary embodiment, each of the display devices may include a plurality of audio output units 161 and 162 outputting a sound based on an audio signal having a plurality of sound sources transmitted through the pairs of input and output connectors 110 and a controller 150 controlling the audio output units 161 and 162 to output a sound based on whether the audio signal is transmitted.

Each of the display devices in the video wall display system may include a plurality of audio output units 161 and 162 disposed on the right and left sides of the display device. Thus, an audio signal is also transmitted through the plurality of a pair of input and output connectors 110 along with an image signal.

However, in the plurality of display devices having the plurality of audio output units 161 and 162, if all the display devices output an input audio signal to all the audio output units 161 and 162, a sound with desired quality is not expressed due to collision/interference in sound.

Figure 6:
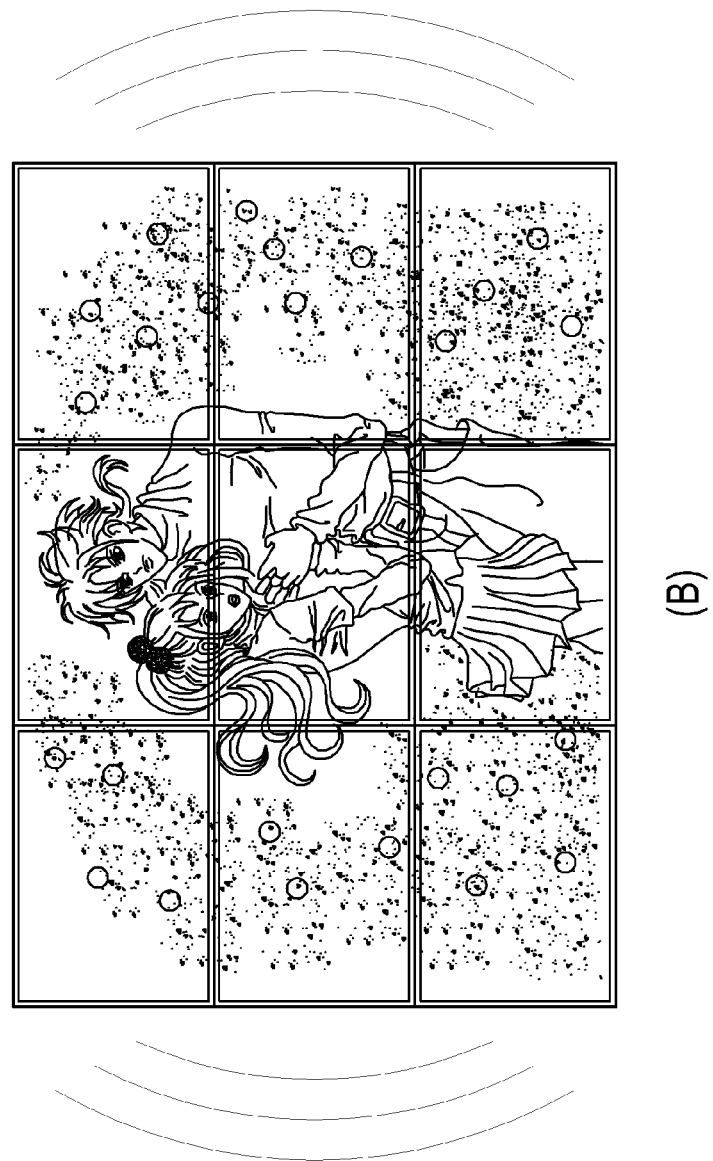
FIG. 6 illustrates an audio signal output from a plurality of audio output units in a video wall display system according to an exemplary embodiment.
Figure 6:
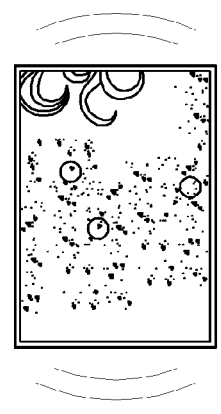

FIG. 6 illustrates an audio signal output from a plurality of audio output units 161 and 162 in a video wall display system according to an exemplary embodiment. As shown in FIG. 6, each display device includes a plurality of audio output units 161 and 162 disposed on the right and left sides. Thus, if a plurality of input audio signals are output by all the audio output units 161 and 162, a sound with desired quality may not be expressed due to collision/interference in sound.

Therefore, the display devices in the video wall display system according to an exemplary embodiment include a controller 150 controlling the audio output units 161 and 162 which output a sound on the basis of whether the audio signals are transmitted via a plurality of pairs of input and output connectors 110 connecting the display devices.

As explained with reference to FIG. 2, each of the display devices according 100 may include a first audio output unit 161 and a second audio output unit 162. However, it is understood that the audio output units 161 and 162 are not limited to this number, but a number of audio output units 161 and 162 corresponding to a plurality of sound sources may be provided.

In the 3×3 video wall in FIG. 4, for example, an audio signal is not transmitted in the upward and downward directions in the second, fifth, and eighth display devices. In this case, the controllers 150 of the second, fifth, and eighth display devices may control all the audio output units 161 and 162 of the second, fifth, and eighty display devices not to output a sound, respectively. Here, the controller 150 also controls the audio output units 161 and 162 outputting a sound on the basis of a transmission direction of the audio signal via the pairs of input and output connectors.

Furthermore, when the audio signal is transmitted to the left and right directions through the pairs of input and output connectors 110, the controller 150 controls the audio output units 161 and 162 not to output a sound.

In the 3×3 video wall in FIG. 4, for example, an audio signal is transmitted only in the left and right directions through the pairs of input and output connectors 110 in the second, fifth, and eighth display devices. In this case, the controllers 150 of the second, fifth, and eighth display devices may control all the audio output units 161 and 162 of the second, fifth, and eighty display devices not to output a sound, respectively.

Here, if the audio signal input through the pairs of input and output connectors 110 is not output in the right direction, the controller 150 controls the audio output units 161 and 162 so that only audio output units 162 disposed in the right side of the display devices output a sound.

In the 3×3 video wall in FIG. 3, for example, an audio signal is input in the left direction through the pairs of input and output connectors 110 but is not output in the right direction in the third display device, an audio signal is input in the downward direction through the pairs of input and output connectors 110 but is not output in the right direction in the fourth display device, or an audio signal is input in the left direction through the pairs of input and output connectors 110 but is not output in any direction in the ninth display device. In this case, the controller 150 controls audio output units 162 disposed on the right side of the display devices not to output a sound.

Here, if the audio signal input through the pairs of input and output connectors 110 is not output in the left direction, the controller 150 controls the audio output units 161 and 162 so that only audio output units 161 disposed in the left side of the display devices output a sound.

In the 3×3 video wall in FIG. 4, for example, an audio signal is input in the downward direction through the pairs of input and output connectors 110 but is not output in the left direction in the first display device, an audio signal is input in the right direction through the pairs of input and output connectors 110 but is not output in the left direction in the sixth display device, or an audio signal is input in the downward direction through the pairs of input and output connectors 110 but is not output in the left direction in the seventh display device. In this case, the controller 150 controls audio output units 161 disposed on the left side of the display devices not to output a sound.

Therefore, without additionally providing a device with a pivot function, a pivot function is economically realized.

While not restricted thereto, the exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, the exemplary embodiments may be written as computer programs transmitted over a computer-readable transmission medium, such as a carrier wave, and received and implemented in general-use digital computers that execute the programs. Moreover, while not required in all aspects, one or more units of the display device 100 can include a processor or microprocessor executing a computer program stored in a computer-readable medium, such as a local storage.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A video wall display system comprising a plurality of display devices, each of the plurality of display devices comprising:
    a pair of input and output connectors comprising an input connector configured to be connected to a first neighboring display device among the plurality of display devices and which is configured to input an image signal from the first neighboring display device, and an output connector configured to be respectively connected to a second neighboring display device among the plurality of display devices and which is configured to output the input image signal to the second neighboring display device;
    a signal processor which is configured to process the input image signal input;
    a display which is configured to display an image based on the processed image signal,
    a first audio output unit on a first side of the display device corresponding to a location of the first neighboring device, and which is configured to output a sound based on a received audio signal;
    a second audio output unit on a second side of the display device corresponding to a location of the second neighboring device, and which is configured to output the sound based on the received audio signal; and
    a controller which is configured to control the first audio output unit not to output the sound if the input connector is connected to the first neighboring display device, and which is further configured to control the second audio output unit not to output the sound if the output connector is connected to the second neighboring display device.

2. The video wall display system according to claim 1, wherein the signal processor is further configured to process the input image signal and to control the pair of input and output connectors to output the image signal to the output connector connected to the second neighboring display device.

3. The video wall display system according to claim 1, wherein:
    at least one of the plurality of display devices further comprises a user signal input unit which is configured to input a user signal from a user; and
    the input user signal is configured to be serially transmitted to other of the plurality of display devices, other than the at least one of the plurality of display devices, through the pair of input and output connectors.

4. The video wall display system according to claim 3, wherein each of the plurality of display devices further comprises a serial communication interface for input and output of the input user signal.

5. The video wall display system according to claim 4, wherein each of the plurality of display devices further comprises a controller which is configured to identify a target display device of the input user signal, the controller is further configured to perform a process corresponding to the input user signal if identified as the target display device of the input user signal, and to control the serial communication interface to convert the input user signal into a signal for serial communication to be bypassed if identified not as the target display device of the user signal.

6. The video wall display system according to claim 5, wherein the controller is further configured to perform the process corresponding to the input user signal and to control the serial communication interface to convert the input user signal into the signal for serial communication to be output.

7. The video wall display system according to claim 5, wherein:
the input user signal is a signal for identification (ID) setup of each of the display devices; and
each controller is further configured to identify the target display device of the input user signal, to perform an ID setup corresponding to the input user signal if identified as the target display device, and to bypass the input user signal if identified not as the target display device.

8. The video wall display system according to claim 5, wherein:
the input user signal is a signal for at least one color adjustment to each of the display devices;
the at least one color adjustment includes at least one of an adjustment to screen brightness, tone of color, contrast, white balance, definition, and tint; and
each controller is further configured to identify an object of the input user signal, to perform the at least one color adjustment corresponding to the input user signal if identified as the target display device of the input user signal, and to bypass the input user signal if identified not as the target display device.

9. The video wall display system according to claim 8, wherein the input user signal is a signal for overall color adjustment to the video wall display system, and the respective controllers of all of the plurality of display devices are configured to perform the at least one color adjustment to the respective display device in accordance with the signal for the overall color adjustment to the video wall display system.

10. The video wall display system according to claim 1, wherein the controller is further configured to control the audio output of the plurality of audio output units based on a transmission direction of the audio signal through the pair of input and output connectors.

11. The video wall display system according to claim 1, wherein:
the pair of input and output connectors further comprises another output connector connected to a third neighboring display device among the plurality of display devices to output the input image signal to the third neighboring display device; and
the output connector is provided on a first side of the display device and the other output connector is provided on a second side of the display device.

12. The video wall display system according to claim 1, wherein the control of the output connector comprises a manipulating a switch so that the image signal is not output to the output connector.

13. The video wall display system according to claim 1, wherein the control of the output connector comprises a controlling of a switch by the signal processor.

14. A display device of a video wall display system comprising a plurality of display devices, the display device comprising:
a pair of input and output connectors comprising an input connector connectable to a first neighboring display device among the plurality of display devices to input an image signal from the first neighboring display device, and an output connector connectable to a second neighboring display device among the plurality of display devices to output the input image signal to the second neighboring display device;
a signal processor which is configured to process the input image signal input;
a display which is configured to display an image based on the processed image signal,
a first audio output unit on a first side of the display device corresponding to a location of the first neighboring device, and which is configured to output a sound based on a received audio signal;
a second audio output unit on a second side of the display device corresponding to a location of the second neighboring device, and which is configured to output the sound based on the received audio signal; and
a controller which is configured to control the first audio output unit not to output the sound if the input connector is connected to the first neighboring display device, and which is further configured to control the second audio output unit not to output the sound if the output connector is connected to the second neighboring display device.

15. The display device according to claim 14, further comprising a switch which is configured to control the output of the input image signal by the output connector to the second neighboring display device according to whether the second neighboring display device is connected to the output connector.

16. The display device according to claim 15, wherein:
the first pair of input and output connectors further comprises another output connector connectable to a third neighboring display device among the plurality of display devices to output the input image signal to the third neighboring display device; and
the switch is further configured to control the output of the input image signal by the other output connector to the third neighboring display device according to whether the third neighboring display device is connected to the other output connector.

17. The display device according to claim 14, further comprising:
a user input unit which is configured to input a user signal from a user,
wherein the output connector is further configured to transmit the input user signal to the second neighboring display device through a serial communication interface.

18. The display device according to claim 17, further comprising:
a controller which is configured to identify a target display device of the input user signal, which is further configured to perform a process corresponding to the input user signal if the display device is identified as the target display device, and which is further configured to control the output connector to transmit the input user signal to the second neighboring display device if the display device is not identified as the target display device.

19. The display device according to claim 14, wherein the input connector is further configured to receive, from the first neighboring display device, a user signal input to the first neighboring display device by a user.

20. The display device according to claim 14, further comprising:
a second pair of input and output connectors, of the plurality of input and output connectors, comprising a second input connector connectable to a third neighboring display device among the plurality of display devices to input an image signal from the third neighboring display device, and an output connector connectable to a fourth neighboring display device among the plurality of display devices to output the input image signal input from the third neighboring display device to the fourth neighboring display device.

21. A method of a video wall display system comprising a plurality of display devices, the method comprising:

receiving, by a first display device among the plurality of display devices, an input image signal from a second display device among the plurality of display devices;

processing the input image signal to be displayed on the first display device;

displaying, by the first device, an image based on the processed input image signal;

outputting a sound based on a received audio signal by a first audio output unit on a first side of the display device corresponding to a location of a first neighboring device;

outputting the sound based on the received audio signal by a second audio output unit on a second side of the display device corresponding to a location of a second neighboring device; and controlling the first audio output unit not to output the sound if an input connector is connected to the first neighboring display device, and controlling the second audio output unit not to output the sound if at least one of the output connectors is connected to the second neighboring display device.

22. The method according to claim 21, further comprising receiving, by the second display device, the image signal from an external device.

23. The display device according to claim 20, further comprising:

a third pair of input and output connectors, of the plurality of pairs of input and output connectors, comprises a third input connector connectable to a fourth neighboring display device among the plurality of display devices to input an image signal from the fourth neighboring display device, and an output connector connectable to a fifth neighboring display device among the plurality of display devices to output the input image signal input from the fourth neighboring display device to the fifth neighboring display device.

* * * * *